United States Patent
Toyoshi et al.

(10) Patent No.: US 11,100,675 B2
(45) Date of Patent: Aug. 24, 2021

(54) INFORMATION PROCESSING APPARATUS, INFORMATION PROCESSING METHOD, PROGRAM, AND MOVING BODY

(71) Applicant: Sony Corporation, Tokyo (JP)

(72) Inventors: Masahiko Toyoshi, Tokyo (JP); Shun Lee, Saitama (JP); Keitaro Yamamoto, Tokyo (JP); Shinichiro Abe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/756,848

(22) PCT Filed: Oct. 11, 2018

(86) PCT No.: PCT/JP2018/037838
§ 371 (c)(1),
(2) Date: Apr. 17, 2020

(87) PCT Pub. No.: WO2019/082669
PCT Pub. Date: May 2, 2019

(65) Prior Publication Data
US 2020/0250854 A1 Aug. 6, 2020

(30) Foreign Application Priority Data
Oct. 24, 2017 (JP) .............................. JP2017-205178

(51) Int. Cl.
*G06T 7/73* (2017.01)
*G06T 7/00* (2017.01)

(52) U.S. Cl.
CPC .............. *G06T 7/74* (2017.01); *G06T 7/0002* (2013.01); *G06T 2207/10004* (2013.01);
(Continued)

(58) Field of Classification Search
CPC ..................... G06T 7/74; G06T 7/0002; G06T 2207/10004; G06T 2207/10048;
(Continued)

(56) References Cited

U.S. PATENT DOCUMENTS

| | | | |
|---|---|---|---|
| 6,700,124 B1* | 3/2004 | Mekata | H04N 5/33 250/351 |
| 2009/0002475 A1* | 1/2009 | Jelley | H04N 7/142 348/14.01 |

(Continued)

FOREIGN PATENT DOCUMENTS

| | | |
|---|---|---|
| JP | 2005-223605 A | 8/2005 |
| JP | 2013-187862 A | 9/2013 |

(Continued)

OTHER PUBLICATIONS

International Search Report and Written Opinion dated Jan. 8, 2019 for PCT/JP2018/037838 filed on Oct. 11, 2018, 8 pages including English Translation of the International Search Report.

*Primary Examiner* — John B Strege
(74) *Attorney, Agent, or Firm* — Xsensus LLP

(57) ABSTRACT

An information processing apparatus includes a first self-position estimating section configured to estimate a self-position of a moving body using a visible image, a second self-position estimating section configured to estimate the self-position of the moving body using an infrared image, and a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the
(Continued)

| SITUATION | VISIBLE IMAGE WEIGHT | INFRARED IMAGE WEIGHT |
|---|---|---|
| DAYTIME | INCREASE | DECREASE |
| NIGHT TIME | DECREASE | INCREASE |
| FOG | GREAT DECREASE | GREAT INCREASE |
| SNOW | DECREASE | INCREASE |
| DOWNTOWN AREA | INCREASE | DECREASE |
| HIGH SPEED DRIVING | INCREASE | DECREASE |
| ⋮ | ⋮ | ⋮ | first weight and the second weight. The present technology is applicable to moving bodies, for example, vehicles.

19 Claims, 8 Drawing Sheets

(52) U.S. Cl.
CPC ............... *G06T 2207/10048* (2013.01); *G06T 2207/20212* (2013.01); *G06T 2207/30248* (2013.01)

(58) Field of Classification Search
CPC . G06T 2207/20212; G06T 2207/30248; G06T 2207/30244; G06T 2207/10012; G06T 2207/10024; G01C 21/1652; G08G 1/16
See application file for complete search history.

(56) References Cited

U.S. PATENT DOCUMENTS

| | | | | |
|---|---|---|---|---|
| 2012/0299702 | A1* | 11/2012 | Edara | G01S 19/49 340/8.1 |
| 2016/0063711 | A1* | 3/2016 | Ogasawara | G06T 7/136 348/164 |
| 2017/0221224 | A1* | 8/2017 | Domae | G06T 7/74 |
| 2018/0197022 | A1* | 7/2018 | Fujikawa | H04N 5/33 |

FOREIGN PATENT DOCUMENTS

| | | |
|---|---|---|
| JP | 2016-156973 A | 9/2016 |
| WO | 2016/016955 A1 | 2/2016 |
| WO | 2017/043067 A1 | 3/2017 |

* cited by examiner

| SITUATION | VISIBLE IMAGE WEIGHT | INFRARED IMAGE WEIGHT |
|---|---|---|
| DAYTIME | INCREASE | DECREASE |
| NIGHT TIME | DECREASE | INCREASE |
| FOG | GREAT DECREASE | GREAT INCREASE |
| SNOW | DECREASE | INCREASE |
| DOWNTOWN AREA | INCREASE | DECREASE |
| HIGH SPEED DRIVING | INCREASE | DECREASE |
| ⋮ | ⋮ | ⋮ |

FIG. 8

| | VISIBLE IMAGE SENSOR | INFRARED IMAGE SENSOR | LiDAR | PRESENT TECHNOLOGY |
|---|---|---|---|---|
| DAYTIME | ○ | × | ○ | ○ |
| NIGHT TIME | △ | ○ | ○ | ○ |
| RAIN | △ | △ | △ | △ |
| FOG | × | ○ | × | ○ |
| SNOW | △ | △ | × | ○ |
| HEADLIGHT OF ONCOMING CAR | × | ○ | ○ | ○ |
| HIGH SPEED DRIVING | ○ | × | × | ○ |
| PRICE | ◎ | ○ | × | ○ |

INFORMATION PROCESSING APPARATUS, INFORMATION PROCESSING METHOD, PROGRAM, AND MOVING BODY

CROSS-REFERENCE TO RELATED APPLICATIONS

The present application is based on PCT filing PCT/JP2018/037838, filed Oct. 11, 2018, which claims priority to JP 2017-205178, filed Oct. 24, 2017, the entire contents of each are incorporated herein by reference.

TECHNICAL FIELD

The present technology relates to an information processing apparatus, an information processing method, a program, and a moving body, and in particular, to an information processing apparatus, an information processing method, a program, and a moving body that are suitably used to estimate the self-position of a moving body.

BACKGROUND ART

Hitherto, there has been proposed a method that detects disturbance factors and landmarks by a wide angle camera mounted upward on the upper portion of a moving body, selects landmarks not affected by the disturbance factors, and controls the attitudes of a plurality of standard cameras mounted on the moving body to follow the selected landmarks, to thereby enhance the environmental tolerance of self-position estimation (for example, see PTL 1).

CITATION LIST

Patent Literature

[PTL 1]
PCT Patent Publication No. WO2016/016955

SUMMARY

Technical Problem

However, in the invention described in PTL 1, it is necessary to select landmarks not affected by disturbance factors and individually control the attitudes of the plurality of standard cameras to follow the selected landmarks, leading to complex processing.

The present technology has been made in view of such circumstances, and is aimed at easily enhancing the environmental tolerance of self-position estimation of a moving body.

Solution to Problem

According to a first aspect of the present technology, there is provided an information processing apparatus including a first self-position estimating section configured to estimate a self-position of a moving body using a visible image, a second self-position estimating section configured to estimate the self-position of the moving body using an infrared image, and a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

According to the first aspect of the present technology, there is provided an information processing method including, by an information processing apparatus, estimating a self-position of a moving body using each visible image and infrared image, and setting, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

According to the first aspect of the present technology, there is provided a program for causing a computer to execute processing of estimating a self-position of a moving body using each visible image and infrared image, and setting, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

According to a second aspect of the present technology, there is provided a moving body including a visible image sensor configured to take a visible image, an infrared image sensor configured to take an infrared image, a first self-position estimating section configured to estimate a self-position using the visible image, a second self-position estimating section configured to estimate the self-position using the infrared image, and a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

In the first aspect or the second aspect of the present technology, a self-position of a moving body is estimated using each visible image and infrared image. A first weight for a first estimation result obtained by self-position estimation using the visible image and a second weight for a second estimation result obtained by self-position estimation using the infrared image are set on the basis of a situation in which the moving body is placed. The first estimation result and the second estimation result are combined using the first weight and the second weight.

Advantageous Effect of Invention

According to the first aspect or the second aspect of the present technology, it is possible to easily enhance the environmental tolerance of self-position estimation of a moving body.

Note that, the effect described herein is not necessarily limited, and may be any effect described in the present disclosure.

BRIEF DESCRIPTION OF DRAWINGS

FIG. 8 is a table comparing self-position estimation methods.

DESCRIPTION OF EMBODIMENT

Now, a mode for embodying the present technology is described. The description is made in the following order.
1. Configuration Example of Vehicle Control System
2. Embodiment
3. Modified Examples
4. Others

1. Configuration Example of Vehicle Control System

Figure 1:
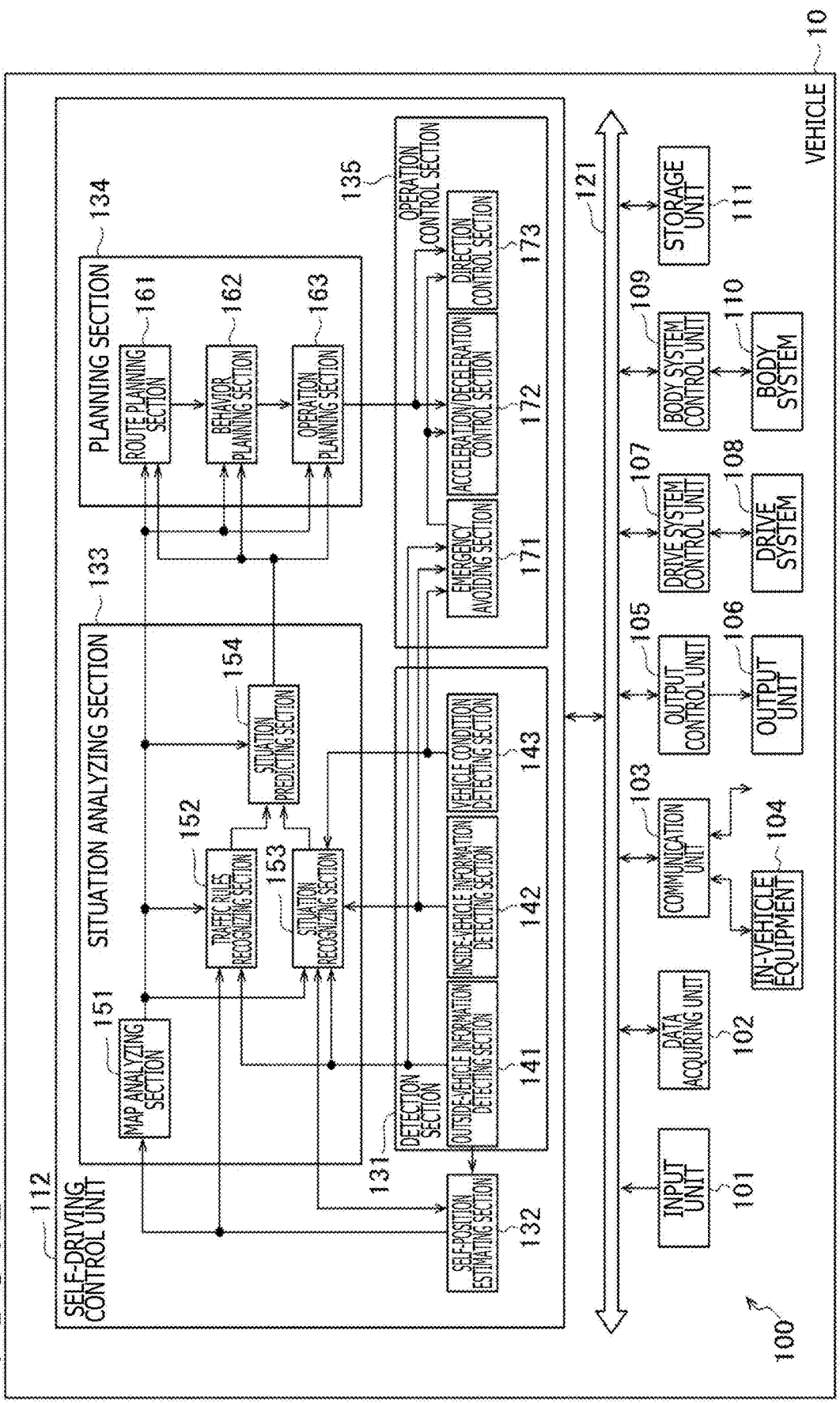
FIG. 1 is a block diagram illustrating a configuration example of the schematic function of a vehicle control system to which the present technology is applicable.

FIG. 1 is a block diagram illustrating a configuration example of the schematic function of a vehicle control system 100 that is an example of a moving body control system to which the present technology is applicable.

The vehicle control system 100 is a system provided to a vehicle 10 and configured to perform various kinds of control of the vehicle 10. Note that, in the following description, in a case where the vehicle 10 is distinguished from another vehicle, the vehicle 10 is referred to as a "vehicle in question."

The vehicle control system 100 includes an input unit 101, a data acquiring unit 102, a communication unit 103, in-vehicle equipment 104, an output control unit 105, an output unit 106, a drive system control unit 107, a drive system 108, a body system control unit 109, a body system 110, a storage unit 111, and a self-driving control unit 112. The input unit 101, the data acquiring unit 102, the communication unit 103, the output control unit 105, the drive system control unit 107, the body system control unit 109, the storage unit 111, and the self-driving control unit 112 are connected to each other via a communication network 121. Examples of the communication network 121 include vehicle-mounted communication networks compliant with any standard, such as a CAN (Controller Area Network), a LIN (Local Interconnect Network), a LAN (Local Area Network), or FlexRay (registered trademark), and buses. Note that, the respective parts of the vehicle control system 100 are directly connected to each other without the communication network 121 in some cases.

Note that, in the following description, in a case where the respective parts of the vehicle control system 100 communicate with each other via the communication network 121, the description of the communication network 121 is omitted. For example, a case where the input unit 101 and the self-driving control unit 112 communicate with each other via the communication network 121 is simply described as a case where the input unit 101 and the self-driving control unit 112 communicate with each other.

The input unit 101 includes an apparatus that an occupant uses to input various kinds of data, instructions, or the like. For example, the input unit 101 includes operation devices such as a touch panel, a button, a microphone, a switch, and a lever, operation devices configured to support input methods other than manual operation, such as voice input and gesture input, or other operation devices. Further, for example, the input unit 101 may be a remote-control apparatus using infrared rays or other radio waves, or externally connected equipment configured to be operated by the vehicle control system 100, such as mobile equipment or wearable equipment. The input unit 101 generates input signals on the basis of data, instructions, or the like input by the occupant, and supplies the input signals to each part of the vehicle control system 100.

The data acquiring unit 102 includes, for example, various sensors configured to acquire data that is used in processing by the vehicle control system 100, and supplies the acquired data to each part of the vehicle control system 100.

For example, the data acquiring unit 102 includes various sensors for detecting the conditions of the vehicle 10, or the like. Specifically, for example, the data acquiring unit 102 includes a gyro sensor, an acceleration sensor, an inertial measurement unit (IMU), and sensors for detecting the amount of accelerator pedal operation, the amount of brake pedal operation, steering wheel steering angles, engine speed, motor speed, wheel rotational speed, or the like.

Further, for example, the data acquiring unit 102 includes various sensors for detecting information outside the vehicle 10. Specifically, for example, the data acquiring unit 102 includes an imaging apparatus such as a ToF (Time Of Flight) camera, a stereo camera, a monocular camera, an infrared camera, or other cameras. Further, for example, the data acquiring unit 102 includes an environmental sensor for detecting weather, meteorological phenomenon or the like, and a peripheral information detecting sensor for detecting objects around the vehicle 10. Examples of the environmental sensor include rain sensors, fog sensors, sunlight sensors, and snow sensors. Examples of the peripheral information detecting sensor include ultrasonic sensors, radars, LiDAR (Light Detection and Ranging, Laser Imaging Detection and Ranging) sensors, and sonars.

Moreover, for example, the data acquiring unit 102 includes various sensors for detecting the current position of the vehicle 10. Specifically, for example, the data acquiring unit 102 includes a GNSS receiver configured to receive GNSS signals from GNSS (Global Navigation Satellite System) satellites.

Further, for example, the data acquiring unit 102 includes various sensors for detecting inside-vehicle information. Specifically, for example, the data acquiring unit 102 includes an imaging apparatus configured to image a driver, a biological sensor configured to detect biological information regarding the driver, a microphone configured to collect sound inside the vehicle, or the like. The biological sensor is provided to each seat or the steering wheel, for example, and detects biological information regarding the occupant sitting on the seat or the driver holding the steering wheel.

The communication unit 103 communicates with the in-vehicle equipment 104 and various types of equipment outside the vehicle, servers, base stations, or the like, and transmits data supplied from each part of the vehicle control system 100 or supplies received data to each part of the vehicle control system 100. Note that, communication protocols with which the communication unit 103 is compatible are not particularly limited. Further, the communication unit 103 can be compatible with a plurality of types of communication protocols.

For example, the communication unit 103 wirelessly communicates with the in-vehicle equipment 104 via a wireless LAN, Bluetooth (registered trademark), NFC (Near Field Communication), WUSB (Wireless USB) or the like. Further, for example, the communication unit 103 communicates with the in-vehicle equipment 104 by wired communication through a connection terminal (and a cable if needed), which is not illustrated, with the use of a USB (Universal Serial Bus), an HDMI (registered trademark) (High Definition Multimedia Interface), an MHL (Mobile High-definition Link) or the like.

Moreover, for example, the communication unit 103 communicates, via base stations or access points, with equipment (for example, application servers or control servers) on external networks (for example, the Internet, cloud networks or company-specific networks). Further, for example, the communication unit 103 uses the P2P (Peer To Peer) technology to communicate with terminals (for example, pedestrian's terminal, store's terminal, or MTC (Machine Type Communication) terminal) near the vehicle 10. Moreover, for example, the communication unit 103 performs V2X communication such as vehicle to vehicle communication, vehicle to infrastructure communication, communication between the vehicle 10 and homes (vehicle to home communication), and vehicle to pedestrian communication. Further, for example, the communication unit 103 includes a beacon receiving section, and receives radio waves or electromagnetic waves that are transmitted from wireless stations installed on roads to acquire information regarding a current position, traffic jams, traffic restrictions, required time, or the like.

The in-vehicle equipment 104 includes, for example, mobile equipment or wearable equipment of the occupant, information equipment that is brought in or mounted on the vehicle 10, and a navigation apparatus configured to search for routes to any destination.

The output control unit 105 controls the output of various pieces of information to the occupant of the vehicle 10 or outside the vehicle. For example, the output control unit 105 generates an output signal including at least one of visual information (for example, image data) or auditory information (for example, sound data), and supplies the output signal to the output unit 106, to thereby control the output of visual information and auditory information from the output unit 106. Specifically, for example, the output control unit 105 combines the data of images taken by a different imaging apparatus of the data acquiring unit 102 to generate a bird's-eye image, a panoramic image or other images, and supplies an output signal including the generated image to the output unit 106. Further, for example, the output control unit 105 generates sound data including, for example, sound or messages warning dangers such as collisions, minor collisions, or entries into dangerous zones, and supplies an output signal including the generated sound data to the output unit 106.

The output unit 106 includes an apparatus capable of outputting visual information or auditory information to the occupant of the vehicle 10 or outside the vehicle. For example, the output unit 106 includes a display apparatus, an instrument panel, an audio speaker, a headphone, a wearable device that the occupant wears, such as a glasses-type display, a projector, or a lamp. The display apparatus of the output unit 106 may be, other than an apparatus including a normal display, an apparatus configured to display visual information in the field of view of the driver, such as a head-up display, a transmissive display, or an apparatus having an AR (Augmented Reality) display function, for example.

The drive system control unit 107 generates various control signals and supplies the control signals to the drive system 108, to thereby control the drive system 108. Further, the drive system control unit 107 supplies the control signals to each part other than the drive system 108 to notify each part of the control states of the drive system 108 as needed, for example.

The drive system 108 includes various apparatuses related to the drive system of the vehicle 10. For example, the drive system 108 includes a driving force generating apparatus for generating driving force for the internal combustion engine, the drive motor, or the like, a driving force transmitting mechanism for transmitting driving force to the wheels, a steering mechanism configured to adjust steering angles, a braking apparatus configured to generate braking force, an ABS (Antilock Brake System), ESC (Electronic Stability Control), and an electric power steering apparatus.

The body system control unit 109 generates various control signals and supplies the control signals to the body system 110, to thereby control the body system 110. Further, the body system control unit 109 supplies the control signals to each part other than the body system 110 to notify each part of the control states of the body system 110 as needed, for example.

The body system 110 includes various body system apparatuses mounted on the vehicle body. For example, the body system 110 includes a keyless entry system, a smart key system, a power window apparatus, power seats, a steering wheel, an air conditioning apparatus, and various lamps (for example, headlamps, backup lamps, brake lamps, blinkers, and fog lamps).

The storage unit 111 includes, for example, a magnetic storage device, such as a ROM (Read Only Memory), a RAM (Random Access Memory), or an HDD (Hard Disc Drive), a semiconductor storage device, an optical storage device, and a magneto-optical storage device. The storage unit 111 stores, for example, various types of programs or data to be used in each part of the vehicle control system 100. For example, the storage unit 111 stores map data such as three-dimensional highly accurate maps such as dynamic maps, global maps having lower accuracy than the highly accurate maps but covering wider areas than the highly accurate maps, and local maps including peripheral information regarding the vehicle 10.

The self-driving control unit 112 performs control related to self-driving such as autonomous driving and driving assistance. Specifically, for example, the self-driving control unit 112 performs cooperative control for the purpose of achieving an ADAS (Advanced Driver Assistance System) function including the collision avoidance or shock mitigation of the vehicle 10, following driving based on vehicle to vehicle distances, vehicle speed maintaining driving, collision warning for the vehicle 10, lane departure warning for the vehicle 10, or the like. Further, for example, the self-driving control unit 112 performs cooperative control for the purpose of achieving, for example, self-driving that allows the vehicle to autonomously travel without the driver's operation. The self-driving control unit 112 includes a detection section 131, a self-position estimating section 132, a situation analyzing section 133, a planning section 134, and an operation control section 135.

The detection section 131 detects various pieces of information necessary for self-driving control. The detection section 131 includes an outside-vehicle information detecting section 141, an inside-vehicle information detecting section 142, and a vehicle condition detecting section 143.

The outside-vehicle information detecting section 141 performs the processing of detecting information outside the vehicle 10 on the basis of data or signals from each part of the vehicle control system 100. For example, the outside-vehicle information detecting section 141 performs the processing of detecting, recognizing, and tracking objects around the vehicle 10, and the processing of detecting distances to the objects. Examples of the objects to be detected include vehicles, humans, obstacles, structures, roads, traffic signals, traffic signs, and road markings. Further, for example, the outside-vehicle information detecting section 141 performs the processing of detecting the surrounding environment of the vehicle 10. Examples of the surrounding environment to be detected include weather, temperature, humidity, brightness, and road conditions. The outside-vehicle information detecting section 141 supplies data indicating the results of the detection processing to the self-position estimating section 132, to a map analyzing section 151, a traffic rules recognizing section 152, and a situation recognizing section 153 of the situation analyzing section 133, and to an emergency avoiding section 171 of the operation control section 135, for example.

The inside-vehicle information detecting section 142 performs the processing of detecting inside-vehicle information on the basis of data or signals from each part of the vehicle control system 100. For example, the inside-vehicle information detecting section 142 performs the processing of authenticating and recognizing the driver, the processing of detecting the driver's conditions, the processing of detecting occupants, the processing of detecting inside-vehicle environment, and the like. Examples of the driver's conditions to be detected include physical conditions, alertness, concentration, fatigue, and line-of-sight directions. Examples of the inside-vehicle environment to be detected include temperature, humidity, brightness, and smells. The inside-vehicle information detecting section 142 supplies data indicating the results of the detection processing to the situation recognizing section 153 of the situation analyzing section 133, the emergency avoiding section 171 of the operation control section 135, and the like.

The vehicle condition detecting section 143 performs the processing of detecting the conditions of the vehicle 10 on the basis of data or signals from each part of the vehicle control system 100. Examples of the conditions of the vehicle 10 to be detected include speed, acceleration, steering angles, whether or not there is an abnormality, the details of an abnormality, driving operation states, the positions and inclination of the power seats, whether the door is locked or unlocked, and the conditions of other vehicle-mounted equipment. The vehicle condition detecting section 143 supplies data indicating the results of the detection processing to the situation recognizing section 153 of the situation analyzing section 133, the emergency avoiding section 171 of the operation control section 135, and the like.

The self-position estimating section 132 performs the processing of estimating, for example, the positions and attitudes of the vehicle 10 on the basis of data or signals from the respective parts of the vehicle control system 100, such as the outside-vehicle information detecting section 141 and the situation recognizing section 153 of the situation analyzing section 133. Further, the self-position estimating section 132 generates, as needed, local maps that are used in self-position estimation (hereinafter referred to as a "map for self-position estimation"). The maps for self-position estimation are, for example, highly accurate maps using a technology such as SLAM (Simultaneous Localization and Mapping). The self-position estimating section 132 supplies data indicating the results of the estimation processing to the map analyzing section 151, the traffic rules recognizing section 152, and the situation recognizing section 153 of the situation analyzing section 133, and the like. Further, the self-position estimating section 132 stores the maps for self-position estimation in the storage unit 111.

The situation analyzing section 133 performs the processing of analyzing the states of the vehicle 10 and situations around the vehicle 10. The situation analyzing section 133 includes the map analyzing section 151, the traffic rules recognizing section 152, the situation recognizing section 153, and a situation predicting section 154.

The map analyzing section 151 performs the processing of analyzing various maps stored in the storage unit 111 while using, as needed, data or signals from the respective parts of the vehicle control system 100, such as the self-position estimating section 132 and the outside-vehicle information detecting section 141, to thereby build maps including information necessary for self-driving processing. The map analyzing section 151 supplies the built maps to the traffic rules recognizing section 152, the situation recognizing section 153, the situation predicting section 154, and a route planning section 161, a behavior planning section 162, and an operation planning section 163 of the planning section 134, for example.

The traffic rules recognizing section 152 performs the processing of recognizing traffic rules around the vehicle 10 on the basis of data or signals from the respective parts of the vehicle control system 100, such as the self-position estimating section 132, the outside-vehicle information detecting section 141, and the map analyzing section 151. Through this recognition processing, for example, the locations and states of traffic signals around the vehicle 10, the details of traffic regulations around the vehicle 10, lanes on which the vehicle can travel, and the like are recognized. The traffic rules recognizing section 152 supplies data indicating the results of the recognition processing to the situation predicting section 154 and the like.

The situation recognizing section 153 performs the processing of recognizing situations related to the vehicle 10 on the basis of data or signals from the respective parts of the vehicle control system 100, such as the self-position estimating section 132, the outside-vehicle information detecting section 141, the inside-vehicle information detecting section 142, the vehicle condition detecting section 143, and the map analyzing section 151. For example, the situation recognizing section 153 performs the processing of recognizing the states of the vehicle 10, situations around the vehicle 10, the conditions of the driver of the vehicle 10, and the like. Further, the situation recognizing section 153 generates, as needed, local maps that are used to recognize situations around the vehicle 10 (hereinafter referred to as a "map for situation recognition"). The maps for situation recognition are, for example, occupancy grid maps.

Examples of the states of the vehicle 10 to be recognized include the positions, attitudes, and movement (for example, speed, acceleration, or driving direction) of the vehicle 10, whether or not there is an abnormality, and the details of an abnormality. Examples of the situations around the vehicle 10 to be recognized include the kinds of stationary objects around the vehicle, the positions of the stationary objects, the kinds of moving objects around the vehicle, the positions of the moving objects, the movement of the moving objects (for example, speed, acceleration, or driving direction), the configurations of roads around the vehicle, road surface conditions, and weather, temperature, humidity, and brightness around the vehicle. Examples of the driver's conditions to be recognized include physical conditions, alertness, concentration, fatigue, line-of-sight directions, and driving operation.

The situation recognizing section 153 supplies data indicating the results of the recognition processing (including a map for situation recognition as needed) to the self-position estimating section 132, the situation predicting section 154, and the like. Further, the situation recognizing section 153 stores the map for situation recognition in the storage unit 111.

The situation predicting section 154 performs the processing of predicting situations related to the vehicle 10 on the basis of data or signals from the respective parts of the vehicle control system 100, such as the map analyzing section 151, the traffic rules recognizing section 152, and the situation recognizing section 153. For example, the situation predicting section 154 performs the processing of predicting the states of the vehicle 10, situations around the vehicle 10, the driver's conditions, and the like.

Examples of the states of the vehicle 10 to be predicted include the behavior of the vehicle 10, the occurrence of an abnormality, and travelable distances. Examples of the situations around the vehicle 10 to be predicted include the behavior of moving objects around the vehicle 10, changes in state of traffic signals, and environmental changes such as changes in weather. Examples of the driver's conditions to be predicted include the driver's behavior and physical conditions.

The situation predicting section 154 supplies data indicating the results of the prediction processing to the route planning section 161, the behavior planning section 162, and the operation planning section 163 of the planning section 134 and the like, together with data from the traffic rules recognizing section 152 and the situation recognizing section 153.

The route planning section 161 plans a route to a destination on the basis of data or signals from the respective parts of the vehicle control system 100, such as the map analyzing section 151 and the situation predicting section 154. For example, the route planning section 161 sets a route from a current position to a designated destination on the basis of a global map. Further, for example, the route planning section 161 appropriately changes the route on the basis of situations such as traffic jams, accidents, traffic regulations, or construction works, and the driver's physical conditions. The route planning section 161 supplies data indicating the planned route to the behavior planning section 162 and the like.

The behavior planning section 162 plans a behavior of the vehicle 10 that allows the vehicle to safely travel on a route planned by the route planning section 161 within a planned period of time, on the basis of data or signals from the respective parts of the vehicle control system 100, such as the map analyzing section 151 and the situation predicting section 154. For example, the behavior planning section 162 plans start, stop, travel directions (for example, moving forward, moving backward, turning left, turning right, or turning around), travel lanes, travel speed, passing and the like. The behavior planning section 162 supplies data indicating the planned behavior of the vehicle 10 to the operation planning section 163 and the like.

The operation planning section 163 plans operation of the vehicle 10 for achieving a behavior planned by the behavior planning section 162, on the basis of data or signals from the respective parts of the vehicle control system 100, such as the map analyzing section 151 and the situation predicting section 154. For example, the operation planning section 163 plans acceleration, deceleration, traveling tracks, and the like. The operation planning section 163 supplies data indicating the planned operation of the vehicle 10 to an acceleration/deceleration control section 172 and a direction control section 173 of the operation control section 135 and the like.

The operation control section 135 performs operation control of the vehicle 10. The operation control section 135 includes the emergency avoiding section 171, the acceleration/deceleration control section 172, and the direction control section 173.

The emergency avoiding section 171 performs the processing of detecting emergency such as collisions, minor collisions, entries into dangerous zones, the driver's abnormalities, or abnormalities of the vehicle 10 on the basis of the detection results of the outside-vehicle information detecting section 141, the inside-vehicle information detecting section 142, and the vehicle condition detecting section 143. In a case where the emergency avoiding section 171 detects the occurrence of emergency, the emergency avoiding section 171 plans operation of the vehicle 10 for avoiding the emergency, such as sudden braking or sudden turning. The emergency avoiding section 171 supplies data indicating the planned operation of the vehicle 10 to the acceleration/deceleration control section 172, the direction control section 173, and the like.

The acceleration/deceleration control section 172 performs acceleration/deceleration control for achieving the operation of the vehicle 10 planned by the operation planning section 163 or the emergency avoiding section 171. For example, the acceleration/deceleration control section 172 calculates a control target value for the driving force generating apparatus or the braking apparatus for achieving acceleration, deceleration, or sudden braking, which has been planned, and supplies a control instruction indicating the calculated control target value to the drive system control unit 107.

The direction control section 173 performs direction control for achieving the operation of the vehicle 10 planned by the operation planning section 163 or the emergency avoiding section 171. For example, the direction control section 173 calculates a control target value for the steering mechanism for achieving a traveling track or sudden turning planned by the operation planning section 163 or the emergency avoiding section 171, and supplies a control instruction indicating the calculated control target value to the drive system control unit 107.

2. Embodiment

Next, an embodiment of the present technology is described with reference to FIG. 2 to FIG. 9.

Note that, the present technology is a technology related to the processing by the vehicle control system 100 in FIG. 1, in particular, the processing by the data acquiring unit 102 and the self-position estimating section 132, and the processing of generating map data that is used in the self-position estimation processing.

<Configuration Example of Map Generating System>

Figure 2:
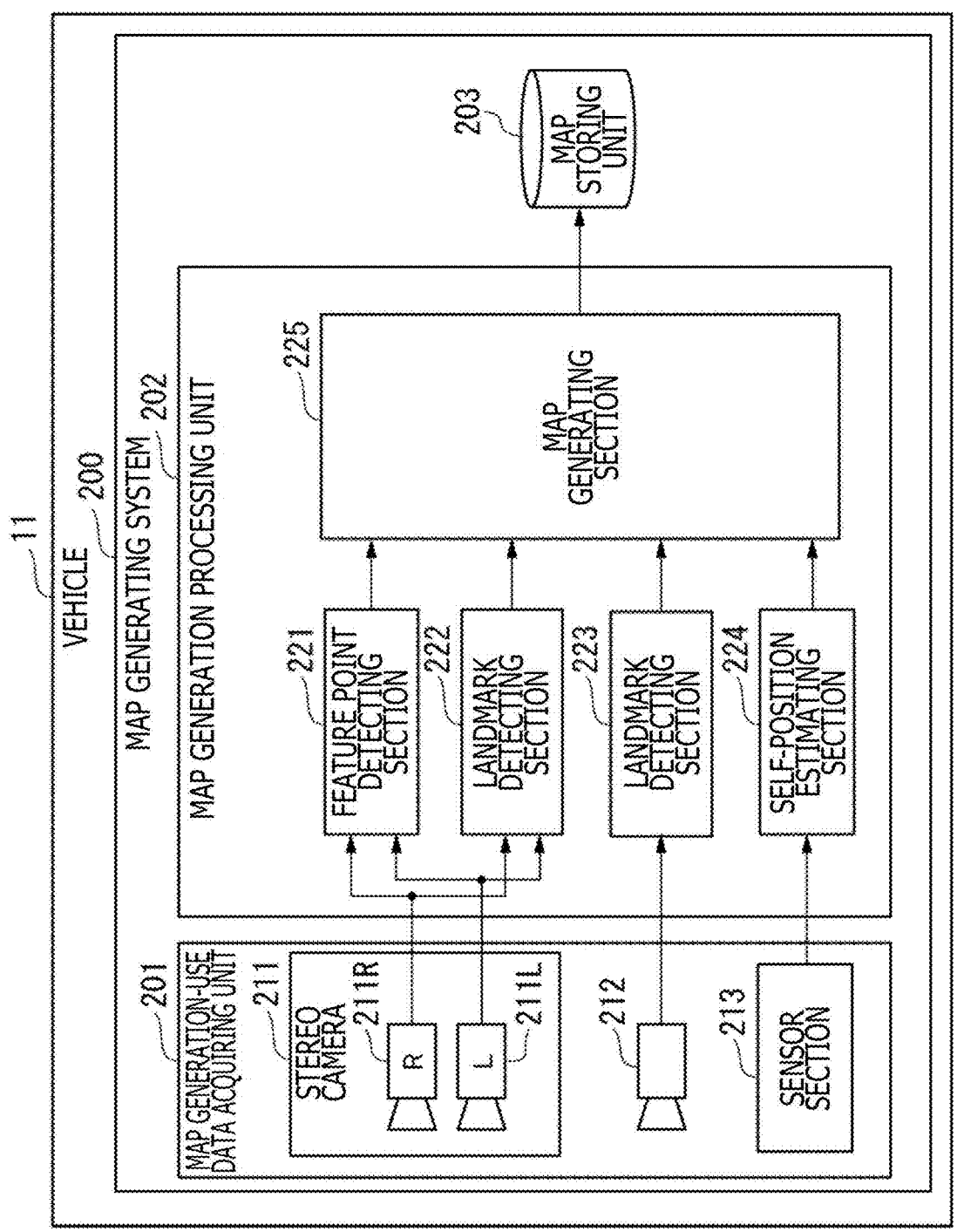
FIG. 2 is a block diagram illustrating a map generating system of one embodiment to which the present technology is applied.

FIG. 2 is a block diagram illustrating a map generating system of one embodiment to which the present technology is applied.

A map generating system 200 is provided, for example, to a vehicle 11 which is different from the vehicle 10 including the vehicle control system 100 in FIG. 1. The map generating system 200 generates maps that are used in the self-position estimation processing in the vehicle control system 100.

The map generating system 200 includes a map generation-use data acquiring unit 201, a map generation processing unit 202, and a map storing unit 203.

The map generation-use data acquiring unit 201 acquires map generation-use data being data that is used in map generation. The map generation-use data acquiring unit 201 includes a stereo camera 211, an infrared image sensor 212, and a sensor section 213.

The stereo camera 211 includes a left visible image sensor 211L and a right visible image sensor 211R. The left visible image sensor 211L and the right visible image sensor 211R each include an image sensor that is sensitive to a visible light region, and take the images of the front area of the vehicle 11 from different directions, namely, left and right (stereo photographing). The left visible image sensor 211L and the right visible image sensor 211R supply color visible images, which are obtained as a result of photographing, to a feature point detecting section 221 and a landmark detecting section 222 of a map generating unit 214.

Note that, in the following description, in a case where a visible image that is taken by the left visible image sensor 211L and a visible image that is taken by the right visible image sensor 211R are distinguished from each other, the former is referred to as a "left visible image," and the latter is referred to as a "right visible image."

The infrared image sensor 212 includes, for example, an image sensor that is sensitive to a predetermined infrared ray wavelength range (for example, predetermined wavelength range in far-infrared ray wavelength range), and takes the images of the front area of the vehicle 11. The infrared image sensor 212 supplies infrared images, which are obtained as a result of photographing, to a landmark detecting section 223 of the map generating unit 214.

Note that, infrared images are generally lower in resolution and noisier than visible images.

The sensor section 213 includes, for example, various sensors configured to detect data that is used to estimate the self-positions of the vehicle 11. For example, the sensor section 213 includes an IMU (Inertial Measurement Unit) configured to detect the acceleration, angular velocity, and the like of the vehicle 11, a GNSS receiver configured to receive GNSS signals from GNSS (Global Navigation Satellite System) satellites, or a LiDAR (Light Detection And Ranging) sensor. The sensor section 213 supplies sensor data that is output from each sensor to a self-position estimating section 224 of the map generation processing unit 202.

The map generation processing unit 202 performs the processing of generating maps that are used in the self-position estimation processing in the vehicle control system 100, and of storing the maps in the map storing unit 203. The map generation processing unit 202 includes the feature point detecting section 221, the landmark detecting section 222, the landmark detecting section 223, the self-position estimating section 224, and a map generating section 225.

The feature point detecting section 221 detects feature points in left visible images and right visible images, and supplies the detection results to the map generating section 225.

The landmark detecting section 222 detects landmarks in left visible images and right visible images, and supplies the detection results to the map generating section 225.

The landmark detecting section 223 detects landmarks in infrared images, and supplies the detection results to the map generating section 225.

The self-position estimating section 224 estimates the self-positions of the vehicle 11 on the basis of sensor data that is supplied from the sensor section 213, and supplies the estimation results to the map generating section 225.

The map generating section 225 generates feature point maps on the basis of the detection results of feature points in left visible images and right visible images and the estimation results of the self-positions of the vehicle 11. Further, the map generating section 225 generates visible landmark maps on the basis of the detection results of landmarks in left visible images and right visible images and the estimation results of the self-positions of the vehicle 11. Moreover, the map generating section 225 generates infrared landmark maps on the basis of the detection results of landmarks in infrared images and the estimation results of the self-positions of the vehicle 11. The map generating section 225 stores the feature point maps, the visible landmark maps, and the infrared landmark maps in the map storing unit 203.

The map storing unit 203 stores feature point maps, visible landmark maps, and infrared landmark maps.

Note that, the map storing unit 203 is not necessarily provided to the vehicle 11 and may be provided to an external server, for example.

<Map Generation Processing>

Figure 3:
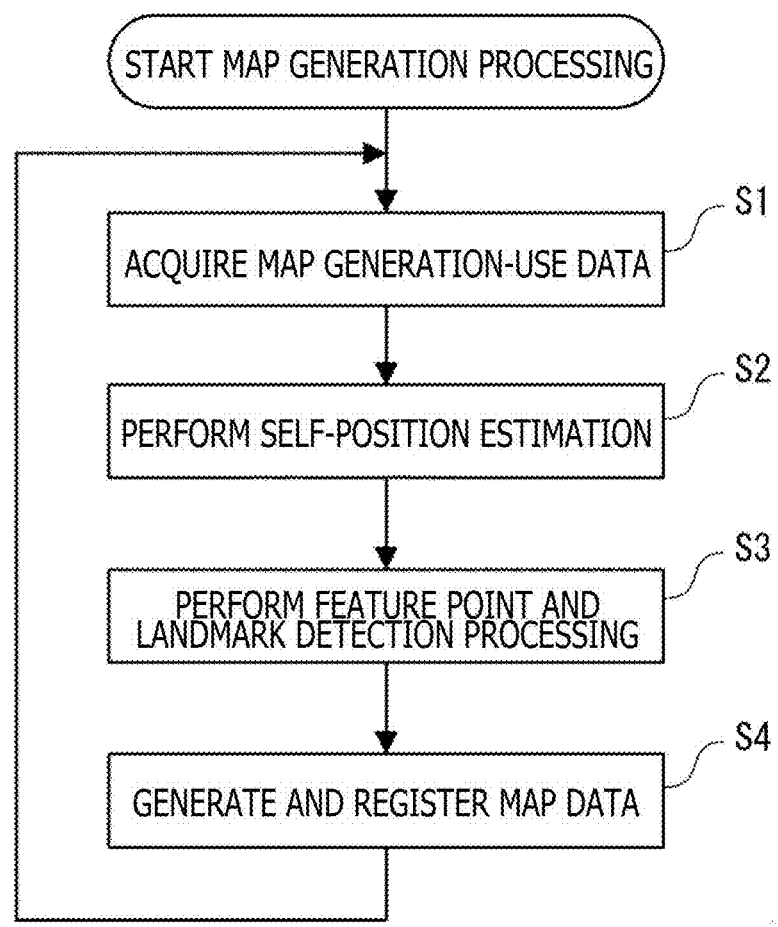
FIG. 3 is a flowchart illustrating map generation processing.

Next, with reference to the flowchart of FIG. 3, map generation processing that is executed by the map generating system 200 is described. For example, this processing starts when a map generation processing start instruction is input to the map generating system 200, and ends when a map generation processing end instruction is input to the map generating system 200.

In Step S1, the map generation-use data acquiring unit 201 acquires map generation-use data.

Specifically, the left visible image sensor 211L and the right visible image sensor 211R take the images of the front area of the vehicle 11, and supply the left visible image and the right visible image obtained respectively to the feature point detecting section 221 and the landmark detecting section 222.

The infrared image sensor 212 takes the image of the front area of the vehicle 11, and supplies the obtained infrared image to the landmark detecting section 222.

Each sensor of the sensor section 213 performs the processing of detecting various kinds of data, and supplies sensor data indicating the detection result to the self-position estimating section 224.

In Step S2, the self-position estimating section 224 estimates a self-position. Specifically, the self-position estimating section 224 estimates the position and attitude of the vehicle 11 by a predetermined method, and supplies the estimation result to the map generating section 225.

Note that, as the method of estimating the positions and attitudes of the vehicle 11, any method can be used. For example, a highly accurate estimation method using RTK (Real Time Kinematic)-GNSS, LiDAR or the like is used.

In Step S3, the map generation processing unit 202 performs feature point and landmark detection processing.

Specifically, the feature point detecting section 221 detects feature points in the left visible image and the right visible image, and calculates the feature amount of each detected feature point. The feature point detecting section 221 supplies data indicating the calculation result to the map generating section 225.

Note that, as the feature point detection method, any method, for example, Harris corner detection, DoG (Difference of Gaussian), or LoG (Laplacian of Gaussian), can be used. Further, as the feature amount calculation method, any method, for example, SIFT (Scale-Invariant Feature Transform), SURF (Speeded Up Robust Features), Haar-Like, or AKAZE, can be used.

The landmark detecting section 222 performs the processing of detecting landmarks in the left visible image and the right visible image, and supplies data indicating the detection result to the map generating section 225.

Note that, examples of the landmarks to be detected include road lane lines, road markings, and road signs.

Further, as the landmark detection method, any method can be used. For example, the landmark detecting section 222 converts the left visible image and the right visible image into bird's-eye views. Next, the landmark detecting section 222 detects the positions, kinds, angles, scales, and the like of the landmarks by template matching, straight line detection, or the like. Next, the landmark detecting section 222 calculates a distance to each landmark on the basis of, for example, parallax between the left visible image and the right visible image.

Note that, the details of the landmark detection method are described in "Bahman Soheilian and two others, "Landmark based localization: LBA refinement using MCMC-optimized projections of RJMCMC-extracted road marks," Intelligent Vehicles Symposium (IV), 2016 IEEE," for example.

The landmark detecting section 223 performs the processing of detecting landmarks in the infrared image, and supplies data indicating the detection result to the map generating section 225.

Note that, as the landmark detection method that the landmark detecting section 223 uses, for example, a method similar to the method that is used by the landmark detecting section 222 is used. Note that, the landmark detecting section 223 calculates a distance to each landmark using, for example, parallax between an infrared image in the latest frame and an infrared image in the previous frame.

In Step S4, the map generating section 225 generates and registers map data.

For example, the map generating section 225 converts, on the basis of the position and attitude of the vehicle 11 estimated by the self-position estimating section 224, the position of each feature point detected by the feature point detecting section 221 into an absolute position on a world coordinate system. The map generating section 225 registers data including the absolute position and feature amount of each feature point with a feature point map stored in the map storing unit 203.

Further, the map generating section 225 converts, on the basis of the position and attitude of the vehicle 11 estimated by the self-position estimating section 224, the position of each landmark detected by the landmark detecting section 222 into an absolute position on the world coordinate system. The map generating section 225 registers data including the kind, absolute position, angle, and scale of each landmark with a visible landmark map stored in the map storing unit 203.

Moreover, the map generating section 225 converts, on the basis of the position and attitude of the vehicle 11 estimated by the self-position estimating section 224, the position of each landmark detected by the landmark detecting section 223 into an absolute position on the world coordinate system. The map generating section 225 registers data including the kind, absolute position, angle, and scale of each landmark with an infrared landmark map stored in the map storing unit 203.

After that, the processing returns to Step S1, and the processes in Step S1 and the subsequent steps are executed.

<Configuration Example of Self-position Estimating System>

Figure 4:
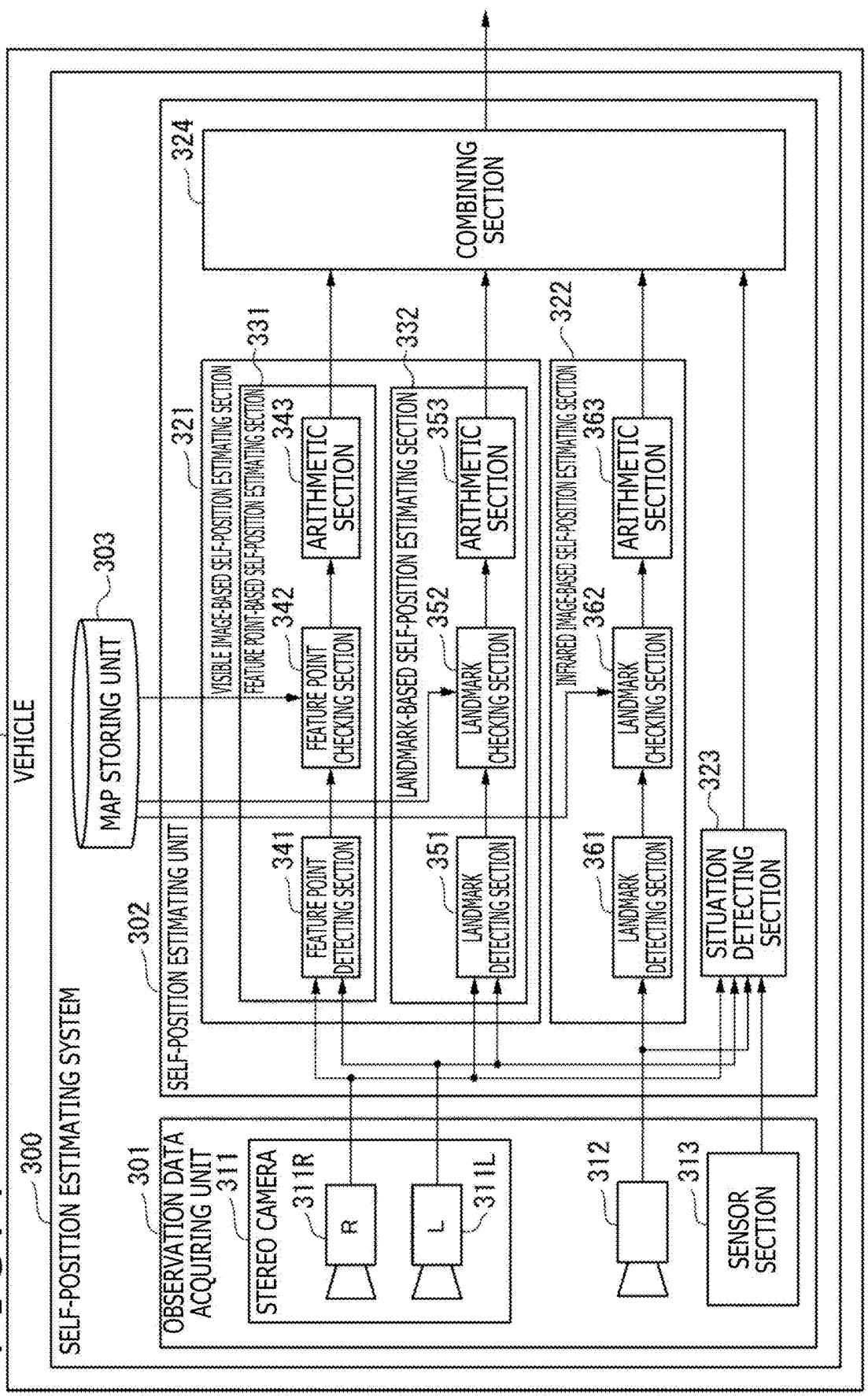
FIG. 4 is a block diagram illustrating a self-position estimating system of one embodiment to which the present technology is applied.

FIG. 4 is a block diagram illustrating a self-position estimating system of one embodiment to which the present technology is applied.

A self-position estimating system 300 is a system configured to perform processing corresponding to the processing by the vehicle control system 100 in FIG. 1, in particular, the processing by the self-position estimating section 132. Specifically, the self-position estimating system 300 performs, using maps generated by the map generating system 200, the self-position estimation processing of estimating the positions and attitudes of the vehicle 10 including the self-position estimating system 300.

The self-position estimating system 300 includes an observation data acquiring unit 301, a self-position estimating unit 302, and a map storing unit 303.

The observation data acquiring unit 301 acquires data that is used in the self-position estimation processing (hereinafter referred to as an "observation data"). The observation data acquiring unit 301 includes a stereo camera 311, an infrared image sensor 312, and a sensor section 313.

The stereo camera 311 includes a left visible image sensor 311L and a right visible image sensor 311R. The left visible image sensor 311L and the right visible image sensor 311R each include an image sensor that is sensitive to a visible light region, and take the images of the front area of the vehicle 10 from different directions, namely, left and right (stereo photographing). The left visible image sensor 311L and the right visible image sensor 311R supply color visible images, which are obtained as a result of photographing, to a feature point detecting section 341, a landmark detecting section 351, and a situation detecting section 323 of the self-position estimating unit 302.

Note that, in the following description, in a case where a visible image that is taken by the left visible image sensor 311L and a visible image that is taken by the right visible image sensor 311R are distinguished from each other, the former is referred to as a "left visible image," and the latter is referred to as a "right visible image."

The infrared image sensor 312 includes an image sensor that is sensitive to an infrared ray wavelength range similar to the infrared ray wavelength range to which the infrared image sensor 212 of the map generating system 200 in FIG. 2 is sensitive, and takes the images of the front area of the vehicle 10. The infrared image sensor 312 supplies infrared images, which are obtained as a result of photographing, to a landmark detecting section 361 and the situation detecting section 323 of the self-position estimating unit 302.

Note that, infrared images are generally lower in resolution and noisier than visible images.

The sensor section 313 includes various sensors configured to detect data that is used to detect situations in which the vehicle 10 is placed. For example, the sensor section 313 includes an IMU configured to detect the acceleration, angular velocity, and the like of the vehicle 10, a GNSS receiver configured to receive GNSS signals from GNSS satellites, an illuminometer, an air flow sensor, a wind direction sensor, a radar, or a polarization camera. The sensor section 313 supplies sensor data that is output from each sensor to the situation detecting section 323 of the self-position estimating unit 302.

The self-position estimating unit 302 performs the processing of estimating the self-positions of the vehicle 10. The self-position estimating unit 302 includes a visible image-based self-position estimating section 321, an infrared image-based self-position estimating section 322, the situation detecting section 323, and a combining section 324.

The visible image-based self-position estimating section 321 performs the processing of estimating the self-positions of the vehicle 10 using visible images. The visible image-based self-position estimating section 321 includes a feature point-based self-position estimating section 331 and a landmark-based self-position estimating section 332.

The feature point-based self-position estimating section 331 performs the processing of estimating the self-positions of the vehicle 10 on the basis of feature points in visible images. The feature point-based self-position estimating section 331 includes the feature point detecting section 341, a feature point checking section 342, and an arithmetic section 343.

The feature point detecting section 341 detects feature points in visible images, and supplies data indicating the detection results to the feature point checking section 342.

The feature point checking section 342 checks feature points in visible images against feature points in feature point maps stored in the map storing unit 303, and supplies data indicating the check results to the arithmetic section 343.

The arithmetic section 343 calculates, on the basis of the check results of feature points in visible images and feature points in feature point maps, the positions and attitudes of the vehicle 10, and supplies data indicating the calculation results to the combining section 324.

The landmark-based self-position estimating section 332 performs the processing of estimating the self-positions of the vehicle 10 on the basis of landmarks in visible images. The landmark-based self-position estimating section 332 includes the landmark detecting section 351, a landmark checking section 352, and an arithmetic section 353.

The landmark detecting section 351 detects landmarks in visible images, and supplies data indicating the detection results to the landmark checking section 352.

The landmark checking section 352 checks landmarks in visible images against landmarks in visible landmark maps stored in the map storing unit 303, and supplies data indicating the check results to the arithmetic section 353.

The arithmetic section 353 calculates the positions and attitudes of the vehicle 10 on the basis of the check results of landmarks in visible images and landmarks in visible landmark maps, and supplies data indicating the calculation results to the combining section 324.

The infrared self-position estimating section 333 performs the processing of estimating the self-positions of the vehicle 10 on the basis of landmarks in infrared images. The infrared self-position estimating section 333 includes the landmark detecting section 361, a landmark checking section 362, and an arithmetic section 363.

The landmark detecting section 361 detects landmarks in infrared images, and supplies data indicating the detection results to the landmark checking section 362.

The landmark checking section 362 checks landmarks in infrared images against landmarks in infrared landmark maps stored in the map storing unit 303, and supplies data indicating the check results to the arithmetic section 363.

The arithmetic section 363 calculates, on the basis of the check results of landmarks in infrared images and landmarks in infrared landmark maps, the positions and attitudes of the vehicle 10, and supplies data indicating the calculation results to the combining section 324.

Note that, parameters that are used in self-position estimation, such as the installation positions, installation directions, and intrinsic matrices of the left visible image sensor 311L, the right visible image sensor 311R, and the infrared image sensor 312, and relative positions and relative attitudes between the sensors, are obtained in advance and set to the self-position estimating unit 302.

The situation detecting section 323 detects situations in which the vehicle 10 is placed, on the basis of visible images, infrared images, and sensor data, and supplies data indicating the detection results to the combining section 324.

The combining section 324 combines, while adjusting weights on the basis of a situation in which the vehicle 10 is placed, the estimation result of the position and attitude of the vehicle 10 from the feature point-based self-position estimating section 331, the estimation result of the position and attitude of the vehicle 10 from the landmark-based self-position estimating section 332, and the estimation result of the position and attitude of the vehicle 10 from the infrared image-based self-position estimating section 322. The combining section 324 outputs the combined estimation result of the position and attitude of the vehicle 10.

The map storing unit 303 stores feature point maps, visible landmark maps, and infrared landmark maps that are generated by the map generating system 200 in FIG. 2.

Note that, the map storing unit 303 is not necessarily provided to the vehicle 10 and may be provided to an external server, for example. In a case where the map storing unit 203 and the map storing unit 303 are each provided to an external server, for example, the map storing unit 203 in FIG. 2 and the map storing unit 303 can be shared.

<Self-Position Estimation Processing>

Figure 5:
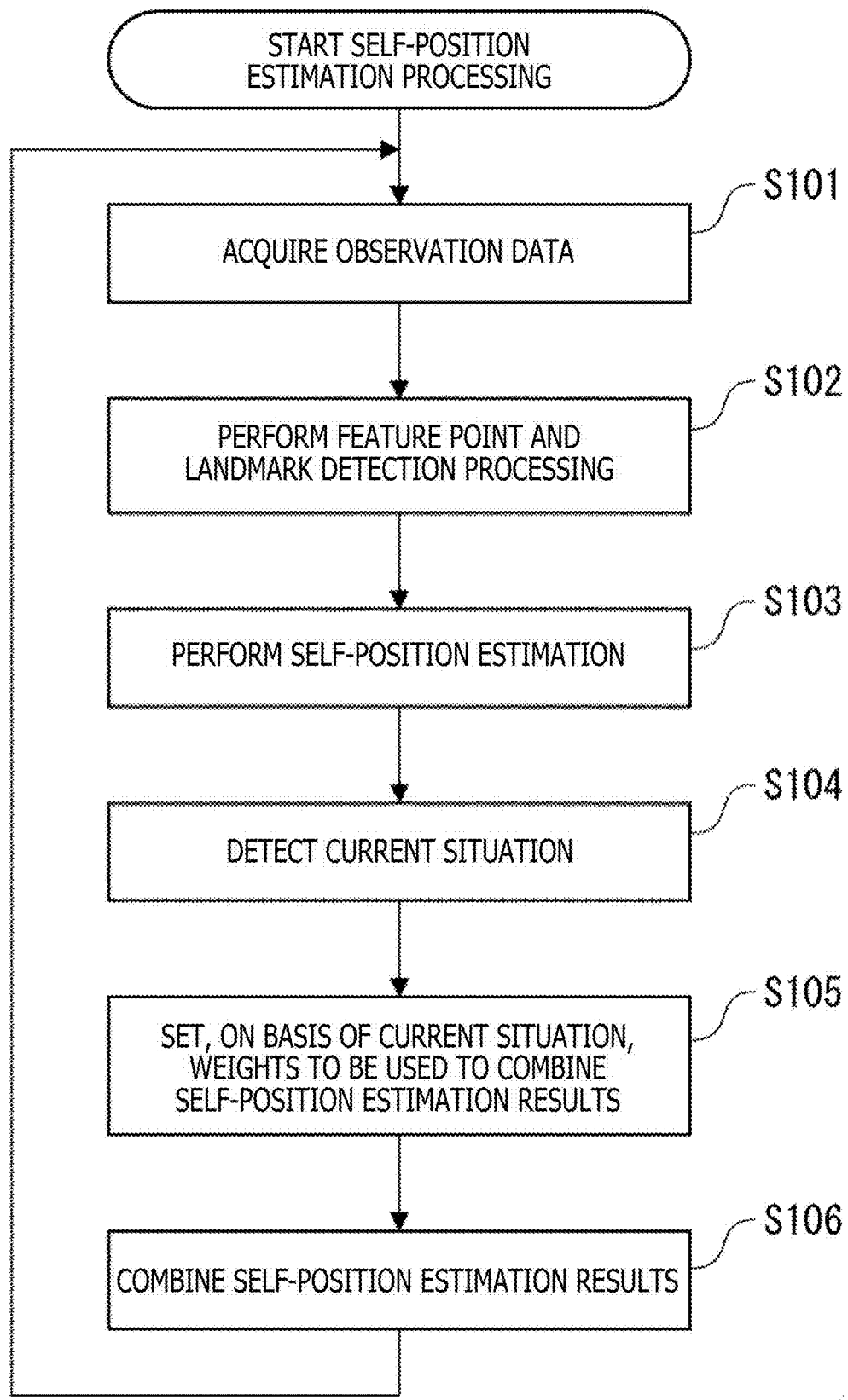
FIG. 5 is a flowchart illustrating self-position estimation processing.

Next, with reference to the flowchart of FIG. 5, self-position estimation processing that is executed by the self-position estimating system 300 is described. Note that, this processing starts when operation for starting the vehicle 10 including the self-position estimating system 300 to start driving is performed, for example, when the ignition switch, power switch, start switch, or the like of the vehicle 10 is turned on. Further, this processing ends when, for example, operation for ending driving is performed, for example, when the ignition switch, power switch, start switch, or the like of the vehicle 10 is turned off.

In Step S101, the observation data acquiring unit 301 acquires observation data.

Specifically, the left visible image sensor 311L and the right visible image sensor 311R take the images of the front area of the vehicle 10, and supply the left visible image and the right visible image obtained respectively to the feature point detecting section 341, the landmark detecting section 351, and the situation detecting section 323.

The infrared image sensor 312 takes the image of the front area of the vehicle 10, and supplies the obtained infrared image to the landmark detecting section 361 and the situation detecting section 323.

Each sensor of the sensor section 313 performs the processing of detecting various kinds of data, and supplies sensor data indicating the detection result to the situation detecting section 323.

In Step S102, the self-position estimating unit 302 performs feature point and landmark detection processing.

Specifically, the feature point detecting section 341 performs the processing of detecting feature points in the left visible image and the right visible image by a method similar to the method that is used by the feature point detecting section 221 of the map generating system 200 in FIG. 2. The feature point detecting section 341 supplies data indicating the feature point detection processing result to the feature point checking section 342.

The landmark detecting section 351 performs the processing of detecting landmarks in the left visible image and the right visible image by a method similar to the method that is used by the landmark detecting section 222 of the map generating system 200. The landmark detecting section 351 supplies data indicating the landmark detection processing result to the landmark checking section 352.

The landmark detecting section 361 performs the processing of detecting landmarks in the infrared image by a method similar to the method that is used by the landmark detecting section 223 of the map generating system 200. The landmark detecting section 361 supplies data indicating the landmark detection processing result to the landmark checking section 362.

In Step S103, the self-position estimating unit 302 estimates a self-position.

The feature point checking section 342 checks the feature points in the left visible image and the right visible image against feature points in a feature point map stored in the map storing unit 303. The feature point checking section 342 supplies data indicating the feature point check result to the arithmetic section 343. The data indicating the feature point check result includes, for example, data indicating a correspondence relationship between the feature points in the left visible image and the right visible image and the feature points in the feature point map. Further, at this time, of the feature points in the left visible image and the right visible image, feature points that do not have corresponding feature points in the feature point map are discarded.

The arithmetic section 343 calculates the position and attitude of the vehicle 10 on the basis of the correspondence relationship between the feature points in the left visible image and the right visible image and the feature points in the feature point map.

Note that, as the method that the arithmetic section 343 uses to calculate the position and attitude of the vehicle 10, any method can be used.

For example, first, the arithmetic section 343 calculates the position and attitude of the left visible image sensor 311L relative to the feature points in the left visible image.

Specifically, for example, the arithmetic section 343 discards, using RANSAC (RANdom SAmple Consensus) or another method, feature points in the left visible image and the right visible image that are outliers having adverse effects on position and attitude estimation.

Next, the arithmetic section 343 defines, as a cost, an error between the positions of feature points that are the remaining feature points in the left visible image which are projected on the right visible image and the positions of the actual feature points in the right visible image. Then, the arithmetic section 343 solves the minimization problem of this cost using the least squares method. With this, the position of the left visible image sensor 311L relative to the feature points in the left visible image (for example, translation matrix) and the attitude of the left visible image sensor 311L relative to the feature points in the left visible image (for example, rotation matrix) are calculated.

Then, the arithmetic section 343 calculates, as the position and attitude of the vehicle 10, the absolute position and absolute attitude of the left visible image sensor 311L on the world coordinate system on the basis of the correspondence relationship between the feature points in the left visible image and the feature points in the feature point map. The arithmetic section 343 supplies the calculation result of the position and attitude of the vehicle 10 to the combining section 324.

By a method similar to the method that is used by the arithmetic section 343, the arithmetic section 353 calculates, on the basis of a correspondence relationship between the landmarks in the left visible image and the right visible image and landmarks in a visible landmark map, the absolute position and absolute attitude of the left visible image sensor 311L on the world coordinate system as the position and attitude of the vehicle 10. The arithmetic section 353 supplies the calculation result of the position and attitude of the vehicle 10 to the combining section 324.

By a method similar to the method that is used by the arithmetic section 353, the arithmetic section 363 calculates, on the basis of a correspondence relationship between the landmarks in the infrared image and landmarks in an infrared landmark map, the absolute position and absolute attitude of the infrared image sensor 312 on the world coordinate system. Then, the arithmetic section 363 calculates, on the basis of the relative position and relative attitude between the infrared image sensor 312 and the left visible image sensor 311L, the absolute position and absolute attitude of the left visible image sensor 311L on the world coordinate system as the position and attitude of the vehicle 10. The arithmetic section 363 supplies the calculation result of the position and attitude of the vehicle 10 to the combining section 324.

Note that, in the example described above, as the position and attitude of the vehicle 10, the absolute position and absolute attitude of the left visible image sensor 311L on the world coordinate system are calculated. However, the absolute position and absolute attitude of the right visible image sensor 311R, the infrared image sensor 312, or another part of the vehicle 10 may be calculated.

In Step S104, the situation detecting section 323 detects a current situation. Specifically, the situation detecting section 323 detects, on the basis of the left visible image, the right visible image, the infrared image, the sensor data from the sensor section 313, and the like, a current situation in which the vehicle 10 is placed. The situation detecting section 323 supplies data indicating the situation detection result to the combining section 324.

Here, for example, situations assumed to affect the accuracy of feature point and landmark detection in the visible images and the accuracy of landmark detection in the infrared image are set as detection targets. For example, situations assumed to affect the image quality of the visible images or the infrared image (for example, sharpness of objects in each image) are set as detection objects.

For example, the situation detecting section 323 detects ambient brightness, weather, and the like on the basis of the left visible image and the right visible image. For example, the situation detecting section 323 detects current time using a clock, which is not illustrated. For example, the situation detecting section 323 detects a driving location, the kind of road, or the like on the basis of a GNSS signal that is supplied from the sensor section 213. The driving location is classified into downtown areas and suburbs, for example. The kind of road is classified into expressways and ordinary roads, for example.

In Step S105, the combining section 324 sets, on the basis of the current situation, weights to be used to combine the self-position estimation results. Specifically, the combining section 324 sets a weight for the self-position estimation results based on the visible images from the feature point-based self-position estimating section 331 and the landmark-based self-position estimating section 332 (hereinafter referred to as a "visible image weight"), and a weight for the self-position estimation result based on the infrared image from the infrared image-based self-position estimating section 322 (hereinafter referred to as an "infrared image weight").

For example, the visible image weight and the infrared image weight are set on the basis of the effect of each situation detected by the situation detecting section 323 on the image quality of the visible images and on the image quality of the infrared image. More specifically, the visible image weight and the infrared image weight are set on the basis of a relative relationship between the effect of each situation on the image quality of the visible images and the effect of each situation on the image quality of the infrared image.

Figures 6, 7:
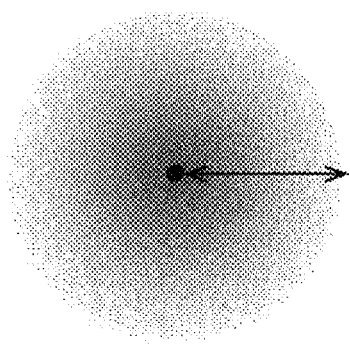
FIG. 6 is a table illustrating a weight setting method.
FIG. 7 is a diagram illustrating an example of a model of an estimated position error of a vehicle.

FIG. 6 illustrates a specific example of a method of setting the visible image weight and the infrared image weight in each situation. For example, the visible image weight and the infrared image weight are first set to predetermined defined values and then adjusted by a manner described below.

For example, in a case where the vehicle 10 is traveling in the daytime, visible images are bright and have high image quality, which means that the detection accuracy of feature points and landmarks in the visible images is high. As a result, the accuracy of visible image-based self-position estimation is high. Meanwhile, infrared images are lower in resolution and noisier than visible images. Thus, the detection accuracy of landmarks in infrared images is lower than the detection accuracy of landmarks in the visible images. Since the accuracy of visible image-based self-position estimation is sufficiently high, excellent self-position estimation accuracy is ensured without self-position estimation results based on the infrared images. Thus, the visible image weight is increased, and the infrared image weight is decreased.

Note that, in this case, since there is a risk that the infrared image sensor 212 is damaged due to sunlight, the infrared image weight may be set to zero to control the infrared image sensor 212 to stop taking images.

Meanwhile, in a case where the vehicle 10 is traveling at night, in visible images, objects in areas other than areas illuminated with the light of the vehicle, streetlamps, road lights, the light of buildings or stores, or the like are hardly recognized. Further, in the visible images, a flare occurs due to, for example, the headlight of an oncoming car in some cases. This results in a reduction in detection accuracy of feature points and landmarks in the visible images, leading to a reduction in accuracy of visible image-based self-position estimation. Meanwhile, the image quality of infrared images is almost the same as that of infrared images taken in the daytime. As a result, the detection accuracy of landmarks in the infrared images hardly drops, and hence the accuracy of infrared image-based self-position estimation hardly drops. Thus, the visible image weight is decreased, and the infrared image weight is increased.

Note that, daytime and night are distinguished from each other with a time determined in advance or with a sunrise time and a sunset time, for example. Alternatively, for example, daytime and night may be distinguished from each other on the basis of ambient brightness.

For example, in a case where the vehicle 10 is traveling in the fog, in visible images, objects are hardly recognized due to the fog. Further, in the visible images, a flare occurs due to, for example, the headlight of an oncoming car in some cases. This results in a great reduction in detection accuracy of feature points and landmarks in the visible images, leading to a great reduction in accuracy of visible image-based self-position estimation. Meanwhile, the image quality of infrared images is hardly affected by the fog. As a result, the detection accuracy of landmarks in the infrared images hardly drops, and hence the accuracy of infrared image-based self-position estimation hardly drops. Thus, the visible image weight is greatly decreased, and the infrared image weight is greatly increased.

Note that, in the case where the vehicle 10 is traveling in the fog, the visible image weight may be set to zero so that only self-position estimation results based on infrared images may be used.

For example, in a case where the vehicle 10 is traveling in the snow, in visible images, it is difficult to recognize objects due to the snow. This results in a reduction in detection accuracy of feature points and landmarks in the visible images, leading to a reduction in accuracy of visible image-based self-position estimation. Meanwhile, although it is also difficult to recognize objects in infrared images due to the snow, the infrared images are less affected by the snow than visible images. This results in a reduction in detection accuracy of landmarks in the infrared images, leading to a reduction in accuracy of infrared image-based self-position estimation. The amount of reduction in accuracy of self-position estimation based on the infrared images is, however, smaller than that of visible image-based self-position estimation. Thus, the visible image weight is decreased, and the infrared image weight is increased.

For example, in a case where the vehicle 10 is traveling in a downtown area, visible images generally have a rich texture and are bright. This results in enhancement of the detection accuracy of feature points and landmarks in the visible images, leading to an enhancement of the accuracy of visible image-based self-position estimation. Meanwhile, as described above, infrared images are lower in resolution and noisier than visible images. Thus, the detection accuracy of landmarks in infrared images is lower than the detection accuracy of landmarks in the visible images. Since the accuracy of visible image-based self-position estimation is sufficiently high, excellent self-position estimation accuracy is ensured without use of self-position estimation results based on the infrared images. Thus, the visible image weight is increased, and the infrared image weight is decreased.

Note that, the downtown areas and the suburbs are distinguished from each other on the basis of map data in which downtown areas and suburbs are classified, for example.

For example, in a case where the vehicle 10 is traveling at high speed, higher self-position estimation accuracy is required. Here, as described above, infrared images are lower in resolution and noisier than visible images, and hence the accuracy of infrared image-based self-position estimation is lower than the accuracy of visible image-based self-position estimation. Thus, the visible image weight is increased, and the infrared image weight is decreased.

Note that, whether or not the vehicle 10 is traveling at high speed is determined on the basis of a threshold determined in advance, for example.

Note that, the situation examples described above are examples, and a greater or less variety of situations may be used as needed.

Further, for example, the weights can be adjusted on the basis of combinations of a plurality of situations. For example, in a case where the vehicle 10 is traveling at high speed at night, if only the night conditions are set, the visible image weight is decreased and the infrared image weight is increased, while if only the high speed driving conditions are set, the visible image weight is increased and the infrared image weight is decreased. Thus, both the weights may not be changed or the increase or decrease amount of the weights may be reduced.

Moreover, the increase or decrease amount of the weights may be adjusted depending on the level of each situation. For example, the increase or decrease amount of the weights may be adjusted depending on how thick the fog is. Further, in a case where the vehicle 10 is traveling at night or in the fog, the decrease amount of the visible image weight may be adjusted depending on whether or not a visible image has a flare. For example, in a case where a flare is detected in a visible image, the decrease amount of the visible image weight may be increased, and in a case where no flare is detected in a visible image, the decrease amount of the visible image weight may be reduced. Moreover, for example, as the speed of the vehicle 10 is increased, the increase amount of the visible image weight and the decrease amount of the infrared image weight may be increased.

In Step S106, the combining section 324 combines the self-position estimation results.

For example, the combining section 324 combines, using an extended Kalman filter (EKF), the estimation results of the position and attitude of the vehicle 10 from the feature point-based self-position estimating section 331, the landmark-based self-position estimating section 332, and the infrared image-based self-position estimating section 322. Here, an example of a method of combining estimation results with the use of an extended Kalman filter is briefly described.

For example, it is assumed that the error of the position of the vehicle 10 estimated by each self-position estimating section follows a normal distribution having an average of zero and a variance $\sigma^2$ as illustrated in FIG. 7. Note that, the center of the circle in FIG. 7 represents an estimated position, and the radius of the circle represents a standard deviation $\sigma$.

As the weight is increased, the variance $\sigma^2$ is decreased, and as the weight is decreased, the variance $\sigma^2$ is increased. For example, the variance of the error of the position of the vehicle 10 estimated by the feature point-based self-position estimating section 331 is denoted by $\sigma 1^2$. The variance $\sigma 1^2$ is decreased as the visible image weight is increased, and is increased as the visible image weight is decreased. In a similar manner, the variance of the error of the position of the vehicle 10 estimated by the landmark-based self-position estimating section 332 is denoted by $\sigma 2^2$. The variance $\sigma 2^2$ is decreased as the visible image weight is increased, and is increased as the visible image weight is decreased. Further, the variance of the error of the position of the vehicle 10 estimated by the infrared image-based self-position estimating section 322 is denoted by $\sigma 3^2$. The variance $\sigma 3^2$ is decreased as the infrared image weight is increased, and is increased as the infrared image weight is decreased.

The estimated positions of the vehicle 10 are combined with Expression (1), for example.

$$Pf = K \times Pe + G1 \times (Po1-Pe) + G2 \times (Po2-Pe) + G3 \times (Po3-Pe) \quad (1)$$

Note that, Pf denotes the combined estimated position of the vehicle 10. K denotes a coefficient matrix. Pe denotes the predicted position of the vehicle 10 based on an equation of state. This equation of state is developed on the assumption that the vehicle 10 performs constant acceleration motion, for example. Po1 denotes the position of the vehicle 10 estimated by the feature point-based self-position estimating section 331. Po2 denotes the position of the vehicle 10 estimated by the landmark-based self-position estimating section 332. Po3 denotes the position of the vehicle 10 estimated by the infrared image-based self-position estimating section 322. G1 to G3 denote Kalman gains.

The Kalman gain G1 is increased as the variance $\sigma 1^2$ of the error of the estimated position Po1 is decreased, for example. As a result, the estimated position Pf approaches the estimated position Po1. Thus, as the visible image weight is increased, the estimated position Pf approaches the estimated position Po1.

The Kalman gain G2 is increased as the variance $\sigma 2^2$ of the error of the estimated position Po2 is decreased, for example. As a result, the estimated position Pf approaches the estimated position Po2. Thus, as the visible image weight is increased, the estimated position Pf approaches the estimated position Po2.

The Kalman gain G3 is increased as the variance $\sigma 3^2$ of the error of the estimated position Po3 is decreased, for example. As a result, the estimated position Pf approaches the estimated position Po3. Thus, as the infrared image weight is increased, the estimated position Pf approaches the estimated position Po3.

Note that, the estimated attitudes of the vehicle 10 are combined by a method similar to the method that is used for estimated positions.

Thus, as the visible image weight is increased, the importance level of the estimated positions and estimated attitudes of the vehicle 10 based on visible images is increased. Specifically, a correlation between the combined estimated position and estimated attitude of the vehicle 10 and the estimated position and estimated attitude of the vehicle 10 based on a visible image is increased, and the combined estimated position and estimated attitude of the vehicle 10 approaches the estimated position and estimated attitude of the vehicle 10 based on the visible image. Meanwhile, as the visible image weight is decreased, the importance level of the estimated positions and estimated attitudes of the vehicle 10 based on visible images is reduced. Specifically, a correlation between the combined estimated position and estimated attitude of the vehicle 10 and the estimated position and estimated attitude of the vehicle 10 based on a visible image is reduced.

In a similar manner, as the infrared image weight is increased, the importance level of the estimated positions and estimated attitudes of the vehicle 10 based on infrared images is increased. Specifically, a correlation between the combined estimated position and estimated attitude of the vehicle 10 and the estimated position and estimated attitude of the vehicle 10 based on an infrared image is increased, and the combined estimated position and estimated attitude of the vehicle 10 approaches the estimated position and estimated attitude of the vehicle 10 based on the infrared image. Meanwhile, as the infrared image weight is decreased, the importance level of the estimated positions and estimated attitudes of the vehicle 10 based on infrared images is reduced. Specifically, a correlation between the combined estimated position and estimated attitude of the vehicle 10 and the estimated position and estimated attitude of the vehicle 10 based on an infrared image is reduced.

Note that, the method of combining the estimated positions and estimated attitudes of the vehicle 10 described above is an example, and other methods may be used. However, irrespective of a method to be used, the estimated positions and estimated attitudes of the vehicle 10 are combined so that, as the visible image weight is increased, the combined estimated position and estimated attitude of the vehicle 10 approaches the estimated position and estimated attitude of the vehicle 10 based on a visible image, and as the infrared image weight is increased, the combined estimated position and estimated attitude of the vehicle 10 approaches the estimated position and estimated attitude of the vehicle 10 based on an infrared image.

The combining section 324 outputs the estimation result of the combined position and attitude of the vehicle 10. For example, the estimation result of the combined position and attitude of the vehicle 10 is supplied to the map analyzing section 151, the traffic rules recognizing section 152, the situation recognizing section 153, and the like in FIG. 1, thereby being used in control related to self-driving such as autonomous driving and driving assistance.

After that, the processing returns to Step S101, and the processes in Step S101 and the subsequent steps are executed.

The processing described above makes it possible to easily enhance the environmental tolerance of self-position estimation of the vehicle 10. Further, with the enhanced environmental tolerance of self-position estimation, the accuracy of self-position estimation of the vehicle 10 is enhanced.

FIG. 8 is a table comparing a case where self-positions are estimated with the use of a visible image sensor, an infrared image sensor, or a LiDAR sensor, to a case where self-positions are estimated with the use of the present technology (self-position estimating system 300). Note that, evaluations for the respective items are indicated by four grades, namely, double circles, circles, triangles, and crosses. Specifically, the double circles, the circles, the triangles, and the crosses indicate the evaluations in descending order.

In the case where a visible image sensor is used, as described above, in the daytime or during high speed driving, the self-position estimation accuracy does not drop. Meanwhile, as described above, at night or when it is snowing, the self-position estimation accuracy drops. When it is foggy or when the visible image sensor is being illuminated with the headlight of an oncoming car, the self-position estimation accuracy largely drops. Also when it is raining, since the rain makes it difficult to recognize objects in visible images, the self-position estimation accuracy drops.

Further, visible image sensors are advantageous in being inexpensive and having high resolutions and wide viewing angles. Moreover, a variety of visible image sensors are available. For example, a plurality of kinds of shutters is available for visible image sensors, such as rolling shutters and global shutters.

In the case where an infrared image sensor is used, as described above, at night, when it is foggy, or when the infrared image sensor is being illuminated with the headlight of an oncoming car, the self-position estimation accuracy does not drop. Meanwhile, as described above, when it is snowing, the self-position estimation accuracy drops. The self-position estimation accuracy largely drops during high speed driving. Further, as described above, in the daytime, there is a risk that the infrared image sensor may be damaged due to sunlight. Also when it is raining, since the rain reduces the accuracy of detection with infrared light, the self-position estimation results are degraded.

Further, infrared image sensors are slightly more expensive than visible image sensors, but are much less expensive than LiDAR sensors. Moreover, infrared image sensors are disadvantageous in, for example, increasing noise due to temperature changes or the like, and having a limitation on the kind of shutter; only rolling shutters are available.

In the case where a LiDAR sensor is used, there is no reduction in self-position estimation accuracy due to differences between daytime and night. Further, the self-position estimation accuracy is not affected by the headlight of an oncoming car. Meanwhile, when it is snowing or when it is foggy, since the lasers are blocked by the snow or the fog, the self-position estimation accuracy largely drops. Further, also when it is raining, since the lasers are blocked by the rain, the self-position estimation accuracy drops. Moreover, during high speed driving, since the reception performance of the return light of the lasers drops, the self-position estimation accuracy largely drops.

Further, LiDAR sensors are advantageous in being capable of accurately measuring distances to objects. Meanwhile, LiDAR sensors are much more expensive and lower in resolution than visible image sensors and infrared image sensors.

In contrast to this, since the self-position estimating system 300 estimates self-positions using both the visible image sensors and infrared image sensor and combines the estimation results, the self-position estimating system 300 can have the advantages of both the sensors. Specifically, the self-position estimation accuracy does not drop except when it is raining. Further, as compared to the case where a LiDAR sensor is used, the self-position estimating system 300 can be achieved at low cost.

Further, in the self-position estimating system 300, neither providing a wide angle camera nor controlling a visible image sensor's attitude and an infrared image sensor's attitude is necessary, unlike the invention described in PTL 1 described above. Moreover, the self-position estimation processing based on visible images and the self-position estimation processing based on infrared images can be executed independently of each other without being coordinated with each other. This achieves easy processing.

As described above, with the use of the present technology, the self-position estimating system having excellent environmental tolerance and high estimation accuracy can be easily achieved at low cost.

3. Modified Examples

Now, modified examples of the embodiment of the technology according to the present disclosure described above are described.

In the example described above, the two visible image sensors, that is, the left visible image sensor 311L and the right visible image sensor 311R, are used. For example, however, distances to feature points or landmarks may be calculated on the basis of parallax between frames or the like with the use of only one visible image sensor.

Further, self-positions may be estimated with the use of only one of feature points and landmarks in visible images, for example.

Moreover, the present technology is also applicable to a case where at least one of the position or attitude of a vehicle is estimated alone.

Further, the present technology is also applicable to a case where self-positions are estimated on the basis of monochrome visible images taken by visible image sensors, for example.

Moreover, for example, the visible image weight and the infrared image weight may be set without consideration of a relative relationship between the effect of each situation on the image quality of visible images and the effect of each situation on the image quality of infrared images, that is, the visible image weight and the infrared image weight may be set while the effects on visible and infrared images are individually considered. Specifically, the visible image weight and the infrared image weight may be set independently.

Further, the present technology is also applicable to the self-position estimation processing of, other than the vehicle exemplified above, various moving bodies including, for example, motorcycles, bicycles, personal mobilities, airplanes, ships, construction machinery, and agricultural machinery (tractors). Further, examples of the moving bodies to which the present technology is applicable also include moving bodies that users drive (operate) remotely without getting on or in the moving bodies, such as drones and robots.

4. Others

<Configuration Example of Computer>

The series of processes described above can be executed by hardware or software. In the case where the series of processes is executed by software, a program configuring the software is installed on a computer. Here, examples of the computer include computers incorporated in dedicated hardware and general-purpose personal computers capable of executing various functions with various programs installed thereon.

Figure 9:
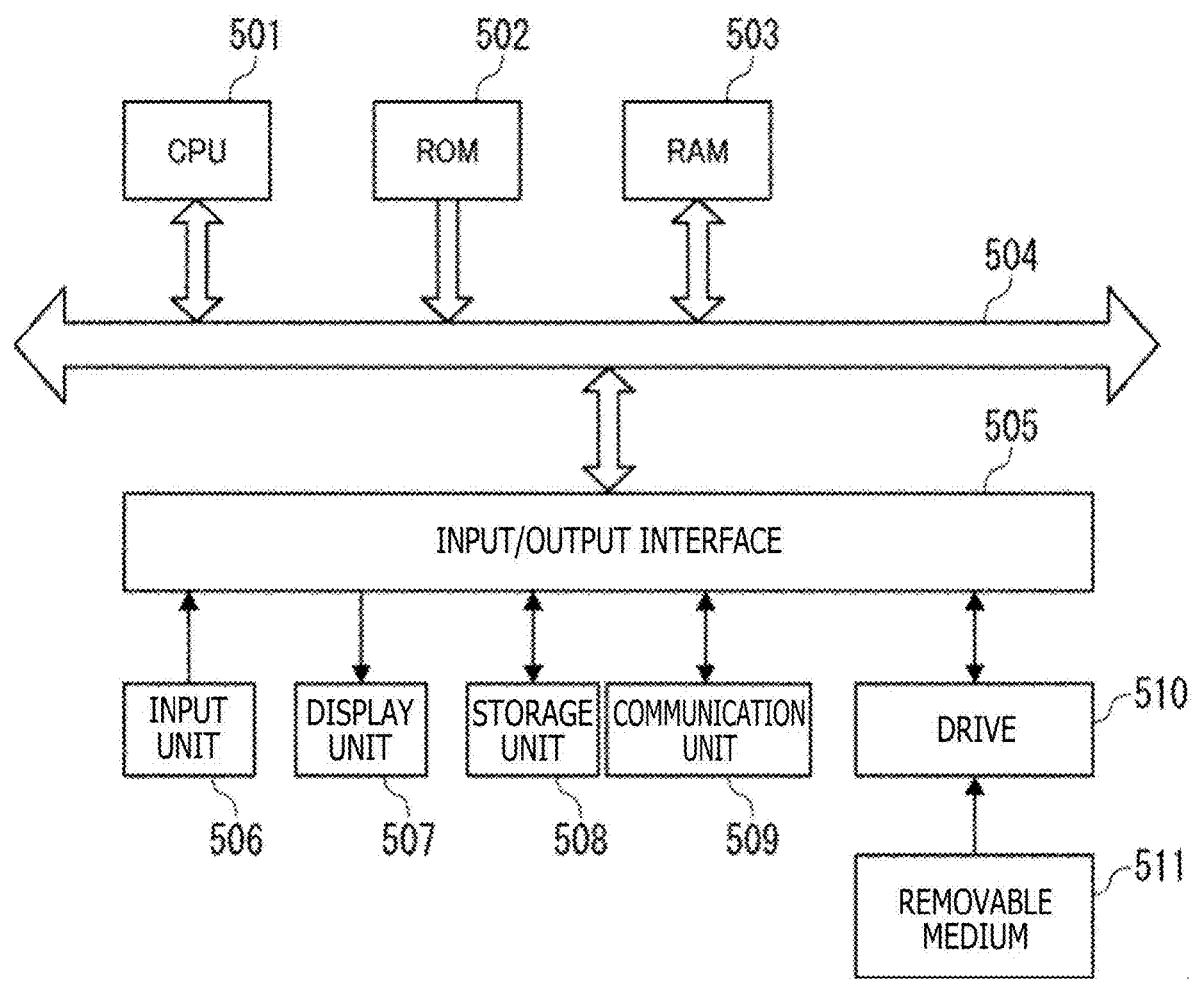
FIG. 9 is a diagram illustrating a configuration example of a computer.

FIG. 9 is a block diagram illustrating a configuration example of the hardware of a computer configured to execute the above-mentioned series of processes with a program.

In a computer 500, a CPU (Central Processing Unit) 501, a ROM (Read Only Memory) 502, and a RAM (Random Access Memory) 503 are connected to each other by a bus 504.

The bus 504 is also connected to an input/output interface 505. The input/output interface 505 is connected to an input unit 506, an output unit 507, a recording unit 508, a communication unit 509, and a drive 510.

The input unit 506 includes, for example, an input switch, a button, a microphone, or an imaging element. The output unit 507 includes, for example, a display or a speaker. The recording unit 508 includes, for example, a hard disk or a non-volatile memory. The communication unit 509 includes a network interface, for example. The drive 510 drives a removable recording medium 511 such as a magnetic disk, an optical disc, a magneto-optical disc, or a semiconductor memory.

In the computer 500 configured as described above, the series of processes described above is performed by causing the CPU 501 to load the program recorded in the recording unit 508 into the RAM 503 through the input/output interface 505 and the bus 504, thereby executing the program, for example.

The program that the computer 500 (CPU 501) executes can be recorded on the removable recording medium 511 such as a package medium to be provided, for example. Further, the program can be provided through a wired or wireless transmission medium such as a local area network, the Internet, or digital satellite broadcasting.

In the computer 500, the program can be installed on the recording unit 508 through the input/output interface 505 with the removable recording medium 511 mounted on the drive 510. Further, the program can be received by the communication unit 509 through a wired or wireless transmission medium to be installed on the recording unit 508. Besides, the program can be installed on the ROM 502 or the recording unit 508 in advance.

Note that, with regard to the program that the computer executes, the processes of the program may be performed in chronological order in the order described herein or in parallel. Alternatively, the processing of the program may be performed at a right timing, for example, when the program is called.

Further, herein, a system means an aggregation of a plurality of components (apparatus, module (part), and the like), and it does not matter whether or not all of the components are in the same cabinet. Thus, plural apparatuses that are accommodated in separate cabinets and connected to each other via a network, and one apparatus including a plurality of modules accommodated in one cabinet are both systems.

Moreover, the embodiment of the present technology is not limited to the embodiment described above, and various modifications are possible without departing from the gist of the present technology.

For example, the present technology can employ the configuration of cloud computing that shares one function in a plurality of apparatuses via a network to process the function in cooperation.

Further, each step described in the above-mentioned flowcharts can be executed by being shared in a plurality of apparatuses as well as being executed by one apparatus.

Moreover, in a case where a plurality of processes is included in one step, the plurality of processes included in the one step can be executed by being shared in a plurality of apparatuses as well as being executed by one apparatus.

<Configuration Combination Examples>

The present technology can also take the following configurations.

(1)

An information processing apparatus including:

a first self-position estimating section configured to estimate a self-position of a moving body using a visible image;

a second self-position estimating section configured to estimate the self-position of the moving body using an infrared image; and a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

(2)

The information processing apparatus according to Item (1), in which the situation in which the moving body is placed includes at least one of weather, brightness, time, or a location.

(3)

The information processing apparatus according to Item (2), in which the combining section increases the first weight and decreases the second weight in daytime.

(4)

The information processing apparatus according to Item (2) or (3), in which the combining section decreases the first weight and increases the second weight at night.

(5)

The information processing apparatus according to any one of Items (2) to (4), in which the combining section increases the first weight and decreases the second weight in a case where the moving body is in a downtown area.

(6) The information processing apparatus according to any one of Items (2) to (5),
in which the combining section increases the first weight and decreases the second weight in a case where the moving body travels at a speed equal to or higher than a predetermined threshold.

(7) The information processing apparatus according to any one of Items (2) to (6),
in which the combining section decreases the first weight and increases the second weight in a case where it is foggy.

(8) The information processing apparatus according to any one of Items (2) to (7),
in which the combining section decreases the first weight and increases the second weight in a case where it is snowing.

(9) The information processing apparatus according to any one of Items (1) to (8),
in which the first weight and the second weight are set based on an effect of each situation on an image quality of the visible image and an effect of each situation on an image quality of the infrared image.

(10) The information processing apparatus according to Item (9),
in which the first weight and the second weight are set based on a relative relationship between the effect of each situation on the image quality of the visible image and the effect of each situation on the image quality of the infrared image.

(11) The information processing apparatus according to Item (9) or (10),
in which the first weight is increased in a situation where the image quality of the visible image is high, and
the second weight is increased in a situation where the image quality of the infrared image is high.

(12) The information processing apparatus according to any one of Items (1) to (11),
in which the combining section decreases an error variance with respect to the first estimation result as the first weight is increased, and decreases an error variance with respect to the second estimation result as the second weight is increased, to thereby combine the first estimation result and the second estimation result using an extended Kalman filter.

(13) The information processing apparatus according to any one of Items (1) to (12),
in which the first self-position estimating section and the second self-position estimating section estimate at least one of a position or an attitude of the moving body.

(14) The information processing apparatus according to any one of Items (1) to (13),
in which the first self-position estimating section estimates the self-position of the moving body based on at least one of a feature point or a landmark in the visible image, and the second self-position estimating section estimates the self-position of the moving body based on a landmark in the infrared image.

(15) The information processing apparatus according to any one of Items (1) to (14), further including:
a situation detecting section configured to detect the situation in which the moving body is placed.

(16) The information processing apparatus according to any one of Items (1) to (15),
in which the visible image is taken by a visible image sensor, and
the infrared image is taken by an infrared image sensor.

(17) An information processing method including:
by an information processing apparatus,
estimating a self-position of a moving body using each visible image and infrared image; and
setting, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

(18) A program for causing a computer to execute processing of:
estimating a self-position of a moving body using each visible image and infrared image; and
setting, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

(19) A moving body including:
a visible image sensor configured to take a visible image;
an infrared image sensor configured to take an infrared image;
a first self-position estimating section configured to estimate a self-position using the visible image;
a second self-position estimating section configured to estimate the self-position using the infrared image; and
a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

Note that, the effects described herein are merely exemplary and are not limited, and other effects may be provided.

REFERENCE SIGNS LIST

10, 11 Vehicle, 100 Vehicle control system, 112 Self-driving control unit, 132 Self-position estimating section, 200 Map generating system, 202 Map generation processing unit, 300 Self-position estimating system, 301 Observation data acquiring unit, 302 Self-position estimating unit, 311L, 311R Visible image sensor, 312 Infrared image sensor, 313 Sensor section, 321 Visible image-based self-position estimating section, 322 Infrared image-based self-position estimating section, 323 Situation detecting section, 324 Combining section, 331 Feature point-based self-position estimating section, 332 Landmark-based self-position estimating section

The invention claimed is:

1. An information processing apparatus comprising:
a first self-position estimating section configured to estimate a self-position of a moving body using a visible image;
a second self-position estimating section configured to estimate the self-position of the moving body using an infrared image; and
a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

2. The information processing apparatus according to claim 1,
wherein the situation in which the moving body is placed includes at least one of weather, brightness, time, or a location.

3. The information processing apparatus according to claim 2,
wherein the combining section increases the first weight and decreases the second weight in daytime.

4. The information processing apparatus according to claim 2,
wherein the combining section decreases the first weight and increases the second weight at night.

5. The information processing apparatus according to claim 2,
wherein the combining section increases the first weight and decreases the second weight in a case where the moving body is in a downtown area.

6. The information processing apparatus according to claim 2,
wherein the combining section increases the first weight and decreases the second weight in a case where the moving body travels at a speed equal to or higher than a predetermined threshold.

7. The information processing apparatus according to claim 2,
wherein the combining section decreases the first weight and increases the second weight in a case where it is foggy.

8. The information processing apparatus according to claim 2,
wherein the combining section decreases the first weight and increases the second weight in a case where it is snowing.

9. The information processing apparatus according to claim 1,
wherein the first weight and the second weight are set based on an effect of each situation on an image quality of the visible image and an effect of each situation on an image quality of the infrared image.

10. The information processing apparatus according to claim 9,
wherein the first weight and the second weight are set based on a relative relationship between the effect of each situation on the image quality of the visible image and the effect of each situation on the image quality of the infrared image.

11. The information processing apparatus according to claim 9,
wherein the first weight is increased in a situation where the image quality of the visible image is high, and
the second weight is increased in a situation where the image quality of the infrared image is high.

12. The information processing apparatus according to claim 1,
wherein the combining section decreases an error variance with respect to the first estimation result as the first weight is increased, and decreases an error variance with respect to the second estimation result as the second weight is increased, to thereby combine the first estimation result and the second estimation result using an extended Kalman filter.

13. The information processing apparatus according to claim 1,
wherein the first self-position estimating section and the second self-position estimating section estimate at least one of a position or an attitude of the moving body.

14. The information processing apparatus according to claim 1,
wherein the first self-position estimating section estimates the self-position of the moving body based on at least one of a feature point or a landmark in the visible image, and
the second self-position estimating section estimates the self-position of the moving body based on a landmark in the infrared image.

15. The information processing apparatus according to claim 1, further comprising:
a situation detecting section configured to detect the situation in which the moving body is placed.

16. The information processing apparatus according to claim 1,
wherein the visible image is taken by a visible image sensor, and
the infrared image is taken by an infrared image sensor.

17. An information processing method comprising:
by an information processing apparatus,
estimating a self-position of a moving body using each visible image and infrared image; and
setting, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

18. A non-transitory computer readable medium storing a program for causing a computer to execute processing of:
estimating a self-position of a moving body using each visible image and infrared image; and
setting, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

19. A moving body comprising:
a visible image sensor configured to take a visible image;

an infrared image sensor configured to take an infrared image;
a first self-position estimating section configured to estimate a self-position using the visible image;
a second self-position estimating section configured to estimate the self-position using the infrared image; and
a combining section configured to set, based on a situation in which the moving body is placed, a first weight for a first estimation result obtained by self-position estimation using the visible image and a second weight for a second estimation result obtained by self-position estimation using the infrared image, to thereby combine the first estimation result and the second estimation result using the first weight and the second weight.

* * * * *